Figure 1:
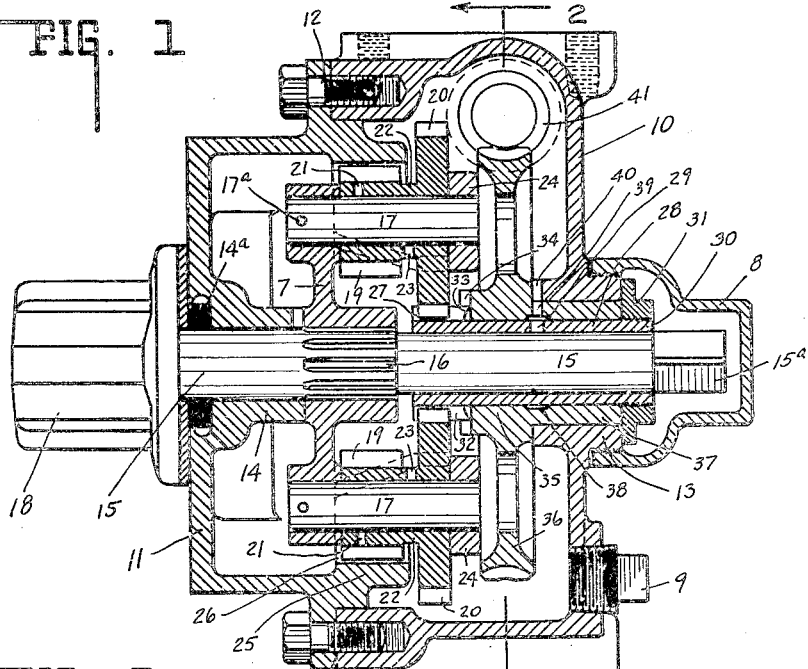

Oct. 26, 1948.    D. T. BROWNLEE    2,452,178
POWER TRANSMISSION SYSTEM
Filed May 25, 1944

INVENTOR.
DALMAR T. BROWNLEE.
BY Lockwood, Goldsmith & Galt
ATTORNEYS.

Patented Oct. 26, 1948

2,452,178

UNITED STATES PATENT OFFICE 2,452,178

POWER TRANSMISSION SYSTEM

Dalmar T. Brownlee, Indianapolis, Ind., assignor to Chas. Drexler Co., Inc., Indianapolis, Ind., a corporation Application May 25, 1944, Serial No. 537,209

10 Claims. (Cl. 74—305)

This invention relates to a power drive suitable for stokers but not necessarily restricted to such use.

This invention is directed to a power drive which is readily separable for relieving a stalling load or obstruction.

This invention also is directed to a power drive which can be economically manufactured and requires a minimum of fabrication and treatment of parts.

This invention further is directed to an automatic cut-out or control for the power source.

One feature of the invention resides in the power arrangement including a planetary-like system driven by a worm wheel or like and clutch connected together through the sun gear of the planetary-like system, said gear embodying one clutch portion and the wheel embodying the other, the gear being relatively movable axially for clutch separation.

Another feature of the invention resides in forming successive power transmitting parts of at least two different materials such as alternating a cast iron or semi-steel with a glaze forming steel whereby a high polish is effected by use between successive parts, heat treating of gears is eliminated, and a comparatively cheap bearing arrangement is effected.

One commercial form of such a glaze forming steel is known as "Stressproof" made by the LaSalle Steel Co. It has a carbon content of .040 to .050, manganese 1.35 to 1.65 and sulphur .24 to .33 and is given a heat treatment that eliminates warping.

Another satisfactory glaze forming steel is S. A. E. T1345 which contains 1.60 to 1.90 manganese.

Still another satisfactory glaze forming steel is one which contains about 1.50 manganese.

Ordinary steels containing .30 to .90 manganese will not glaze in use and while a high manganese steel of 10% to 14% is not only brittle (over 2% is brittle) the same is too hard for conventional machining.

Another feature of the invention is the application of the automtaic cut-out mechanism at the start of the gear train where the loads are lightest and the component parts may be of small size and low cost.

A further feature of the invention resides in the provision of a power source control, such as a normally closed safety switch for the current supply to an electric motor for driving the power unit, the latter including a preloaded construction, that loading being overcome upon drive stalling until the switch is actuated to open the motor circuit.

Other objects and features of the invention will be set forth more fully hereinafter.

The full nature of the invention will be understood from the accompanying drawings and the following description and claims.

In the drawings Fig. 1 is a central sectional view of one embodiment of the invention.

Figure 2:
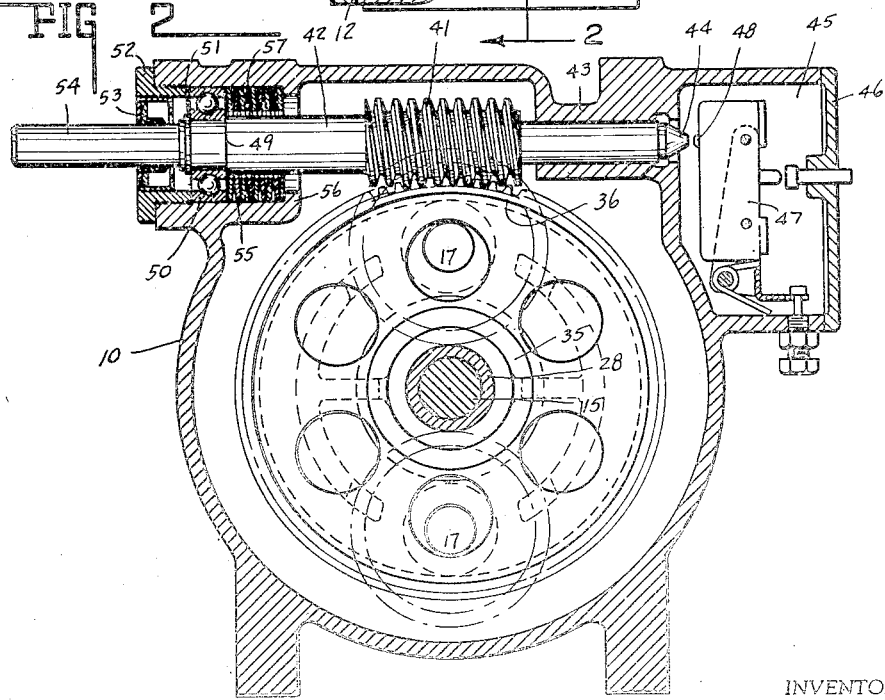

Fig. 2 is a transverse sectional view thereof taken on line 2—2 of Fig. 1 and in the direction of the arrows.

In the drawings, 10 indicates a housing and 11 a cover secured together at 12. The housing includes bearing 13 and aligned therewith is cover bearing 14. Mounted in said bearings is shaft 15 having an intermediate spline portion 16. Seal 14a may be provided in cover bearing 14. Plug 9 in housing 10 may be provided for lubrication purposes.

On the cover exposed end of shaft 15 is suitably secured driver 18 that is adapted to drive a member such as a stoker fuel feeding worm and the like. The opposite end of shaft 15 which projects from the housing and bearing 13 is squared as at 15a. A cap 8 is suitably secured to housing 11 and encloses this end of shaft 15.

Splined to shaft 15 at 16 is the pinion carrier 7. This carrier has two spindles 17 pinned as at 17a. Rotatable on each is a double pinion 19 and 20, the former including a passage 21 to the spindle for lubrication purposes, and the intermediate sleeve portion 22 includes passage 23 for like purposes. Each multiple pinion is retained upon its supporting spindle by a portion of the carrier indicated at 24.

The cover 11 includes an inwardly directed flange 25 concentric with but laterally offset from bearing 14. Said flange is provided with teeth 26 constituting the ring gear with which mesh at all times all pinion portions 19. All pinion portions 20 mesh at all times with sun gear 27 which is rotatably supported on shaft 15.

Said gear is elongated as a sleeve 28 and includes radial passage 29 for lubrication purposes. The outer end 30 of said sleeve projects beyond bearing 13 and is threaded to receive retaining nut 31, all enclosed by cap 8.

Sun gear 27 has laterally projecting teeth 32 which constitute a clutch face 33 confronting a mating clutch face 34 carried by a lateral portion 35 on one side of the hub portion of a worm wheel 36. This sun gear is a cost saving member. The hub is extended oppositely from its clutch face as a sleeve 37 which is rotatably supported within housing bearing 13 and between said sleeve and shaft 15 is interposed sun gear sleeve 28.

Sleeve 37 includes an inner annular channel 38 with which constantly registers radial passage 29 through sleeve 28 when the device is normally operating. Passage 39 in sleeve 37 constantly communicates with channel 38 and intermittently with radial passage or groove 40 in bearing 13. Sleeve 37 terminates coplanar with the outer end of bearing 13. Nut 31 bears upon both the bearing 13 and sleeve 37.

Now should the fuel feeding worm jam, etc., it will be assumed that worm wheel 36 is not rotated since power thereto has been stopped as hereinafter described. Then cap 8 and nut 31 are removed. The projecting end 30 of sleeve 28 is then forced toward driver 18 until clutch face 33 is disengaged from clutch face 34. When this is effected, a wrench may be applied to squared end 15a of shaft 15 to rock the driver 18 backward and forward to free the fuel feeding worm from the obstruction, that is remove the jam by unlocking the fuel feeding worm and then removing the obstruction, such as spike, bolt, rock, or the like.

Observe that when the sun gear is disconnected from the worm wheel at the clutch construction, said gear still meshes with all pinions 26. Likewise at that time the worm wheel has not been rotated in either direction, nor has it been shifted axially.

Following removal of the obstruction, the clutch faces are reengaged and the nut and cap reapplied and the drive is reconditioned for normal use.

Meshing with worm wheel 36 is the worm 41 carried by shaft 42 transverse to and offset from shaft 15. One end of shaft 42 is supported in bearing 43 in housing 10 and terminates in contact portion 44. Housing 10 includes a chamber 45 closed by cover 46, and therein is mounted a normally closed switch 47 controlling the electrical energy supply to a motor which rotates directly or indirectly shaft 42.

This switch construction includes an exposed member 48. When this is moved to the right by axial shifting of projection 44 on shaft 42, the normally closed switch is thereby opened and the motor circuit is opened. This shifting of shaft 42 occurs because when the fuel feeding worm jams, the worm wheel 36 is held stationary and rotation of shaft 42 feeds the worm on the wheel which advances shaft 42 axially for switch opening.

Shaft 42 is shouldered at 49 and bearing thereagainst is the anti-friction structure 50 locked to the shaft 42 at abutment 51 against axial displacement. A retainer 52 is also provided and seal 53 is interposed between the retainer and reduced end 54 of shaft 42. This end of the shaft is to be motor driven.

All the aforesaid is included in bearing means comprising bore 55 of said housing and is aligned with but spaced from bearing bore 43. In bore 55 is bearing shoulder 56. Interposed between said shoulder and the anti-friction structure is a preloaded structure. This in its broad forms may take many different forms such as a coil spring, the loading of which can be adjusted by retainer 52.

Herein, however, the preferred form is illustrated and includes a suitable series of conical washers 57 alternated in opposition as illustrated. The resulting circular accordion-like structure may be a single pair, or a multiple series of washers as illustrated. In either instance, the pressure is concentric with the shaft axis at all times.

As previously stated, when the fuel feeding worm jams, the worm wheel stalls and continued rotation of shaft 42 attempts to feed same to the right and against the preloading of the washer structure. When this is overcome, actual movement of said shaft occurs and the motor switch is thereupon opened.

Herein the worm, the pinions and the shaft are preferably of a glaze forming, manganese steel such as stress proof annealed steel while the worm wheel, sun gear, pinion, carrier and spindles may be cast iron or semi-steel as desired. These two differing materials working together produce a burnished, work hardened surface, thereby eliminating heat treating of gears, etc. As described, with the exception of the sun gear and worm wheel, which are clutch connected and thereby unitary for rotation purposes, these several parts are alternately of one material and the other.

From the foregoing it is noted that the automatic cutout is associated with the driving member. This is usually V-belt driven from a motor that also drives a stoker fan. Hence, the axial throw of the worm shaft is not objectionable in a belt drive. Furthermore, the preloading to oppose, when cutting out the power, is but a fraction of that required if the cutout were associated with the stoker worm etc. Hence, light preloading springs instead of heavy ones may be used.

Stopping the motor also stops the fan so that the fire in the grate will not burn back along the worm or fuel feeding screw and form a clinker difficult to remove.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A power transmission including in combination a power driven meshing worm and wheel, a planetary system including a ring gear, a sun gear, a pinion supporting member, and pinion means carried thereby and meshing with the sun gear and ring gear, a clutch connection between the sun gear and worm wheel, and a shaft for power applying purposes connected to and supporting the member, said shaft projecting through the axially aligned sun gear and worm wheel, said sun gear being slidable axially for clutch connection to and disconnection from the worm gear for the purpose described.

2. In combination with a meshing worm and worm wheel, a planetary system, a shaft operatively connected thereto, the same projecting through the sun gear of the system and the worm wheel, the sun gear projecting through the worm wheel, a clutch between the sun gear and worm wheel, the sun gear being axially slidable on the shaft for connection to and disconnection from the worm wheel for the purpose described.

3. In combination a housing structure, a shaft projecting therethrough at opposite ends, a planetary transmission for the shaft including a sun gear projecting through the housing structure and concentric with the shaft, power means in the housing structure having an axially separable connection with the sun gear, said gear projection being movable into the housing structure for connection separation, the adjacent exposed end of the shaft being rockable for purposes described.

4. A power transmission including in combination a power driven worm, a wheel meshing therewith, a planetary system including a ring gear, a sun gear axially aligned with and immediately adjacent the wheel, a pinion supporting member, and pinion means carried thereby and meshing with the sun gear and ring gear, cooperating driving connection means on the confronting faces of and between the sun gear and worm wheel, a shaft for power applying purposes connected to and supporting the member, said shaft projecting through the axially aligned sun gear and worm wheel, a preloaded constraining construction axially associated with the worm, a power control structure, and means for controlling the latter and operable by rotation and axial movement of the worm when the transmission stalls sufficiently for worm axial movement after the preloading is overcome.

5. A transmission as defined by claim 4 wherein the sun gear is of sleeve type and interposed between the shaft and the wheel for rotatably supporting the wheel, the sleeve gear being rotatable upon said shaft and drivingly connected thereto only through the shaft supported pinion supporting member and the pinions.

6. In a power transmission mechanism having a power driven shaft, a power applying shaft, a worm rotatable by the first mentioned shaft, a wheel meshing with the worm, and a planetary system operatively connected to the wheel and the second mentioned shaft, the combination therewith of a pre-loaded power cut-out device operatively associated with the first mentioned shaft for driven shaft stoppage upon power applying shaft stalling, the device comprising a bearing means through which the driven shaft projects, an abutment on said shaft in spaced relation to said bearing means, and a plurality of abutting, resilient, dished washers arranged alternately with respect to the dishing and normally substantially occupying the space between the bearing means and the abutment and constraining the axially movable driven shaft in the direction of the abutment, and resisting reverse movement of said shaft upon loading of the wheel until the loading overcomes the initial constraint of said washers.

7. Structure as defined by claim 6 wherein the initial constraint is determinable by the number of washers included in the space.

8. Structure as defined by claim 6 wherein there is provided an antifriction means between the washers and the abutment.

9. Structure as defined by claim 6 wherein the washers are disposed to one side of the worm, and means is disposed on the other side of the worm and carried by the driven shaft for power control purposes.

10. Structure as defined by claim 9 wherein an antifriction means is disposed between the washers as a group and said abutment.

DALMAR T. BROWNLEE.

REFERENCES CITED

The following references are of record in the file of this patent:

UNITED STATES PATENTS

| Number | Name | Date |
| --- | --- | --- |
| 443,259 | Pedersen | Dec. 23, 1890 |
| 1,396,426 | Hartford | Nov. 8, 1921 |
| 1,747,594 | Panish | Feb. 18, 1930 |
| 1,829,249 | Beulwitz | Oct. 27, 1931 |
| 1,920,956 | Bruton | Aug. 8, 1933 |
| 1,943,854 | Beckwith | Jan. 16, 1934 |
| 1,951,424 | Lewis | Mar. 20, 1934 |
| 2,006,896 | Joyce | July 2, 1935 |
| 2,116,774 | Walter | May 10, 1938 |
| 2,279,216 | Way | Apr. 7, 1942 |
| 2,317,490 | Simpson | Apr. 27, 1943 |

FOREIGN PATENTS

| Number | Country | Date |
| --- | --- | --- |
| 496,727 | Great Britain | Dec. 2, 1938 |

OTHER REFERENCES

Publication, Spur and Bevel Gearing, 1st ed., pages 42 and 43, The Industrial Press, New York.